April 25, 1950 G. GUANELLA 2,505,043

MEANS FOR FREQUENCY CONVERSION

Filed Dec. 17, 1947 3 Sheets-Sheet 1

INVENTOR.
GUSTAV GUANELLA
BY
ATTORNEY

INVENTOR.
GUSTAV GUANELLA

BY

Kurt Nau

ATTORNEY

INVENTOR.
GUSTAV GUANELLA
BY
[signature]
ATTORNEY

Patented Apr. 25, 1950 2,505,043

UNITED STATES PATENT OFFICE 2,505,043

MEANS FOR FREQUENCY CONVERSION

Gustav Guanella, Zurich, Switzerland, assignor to Radio Patents Corporation, New York, N. Y., a corporation of New York Application December 17, 1947, Serial No. 792,254
In Switzerland September 23, 1946

10 Claims. (Cl. 250—36)

Section 1, Public Law 690, August 8, 1946
Patent expires September 23, 1966

The present invention relates to an arrangement for and a method of frequency conversion, for use in superheterodyne radio receivers, in repeater stations for high frequency relay systems and various other arrangements involving the change of a given signal frequency oscillation into an oscillation of different frequency bearing a predetermined relation to the frequency of the original oscillation.

According to known methods, an electric oscillation having a given frequency is converted into an oscillation of different frequency by superimposing the oscillation to be converted upon or mixing it with an auxiliary oscillation in such a manner as to produce a resultant sum or difference frequency oscillation of the desired frequency.

Such a frequency conversion is commonly employed in known superheterodyne radio receivers. In the latter, an auxiliary oscillator embodied in the receiver serves to generate the necessary auxiliary oscillation, the latter or a suitable harmonic component thereof being used for superimposition upon or beating with an incoming signal frequency. Such a receiver has the disadvantage that spurious and other fluctuations of the carrier frequency of a radio signal being received are not corrected or compensated by the auxiliary oscillator which operates independently of the received oscillations. As a result, the intermediate frequency band may be shifted or displaced to an extent so as to be at least partly outside the operating frequency band of the intermediate frequency amplifier designed to have the usual bandwidth characteristics, depending upon the kind of modulating signal or other message impressed upon the received carrier oscillations.

It is furthermore known to employ one or more frequency conversions in connection with directed beam relay stations using ultra-high frequencies or microwaves for the transmission of signals between distant stations. These directed beam relay stations serve in a known manner to enable communication between a transmitter and a receiver located outside a direct line-of-sight connection. The oscillation intercepted by the relay station has its carrier frequency converted to a different frequency which is in turn re-radiated or transmitted to a receiving point or a further intermediate relay station. Such frequency conversion has been found necessary in order to eliminate regeneration or feed-back coupling between the transmitting and receiving circuits or antennae of the repeater station.

It is also known to produce the necessary auxiliary or beating oscillations by means of frequency stabilized oscillators of the piezo-crystal or other kind located at the repeater stations. Such an arrangement, however, has the disadvantage that even slight frequency deviations of the auxiliary oscillator frequency will result in a corresponding frequency deviation of the oscillation being retransmitted by the repeater station, whereby the errors thus caused in a number of repeaters will be added cumulatively in such a manner as to result in prohibitively large frequency deviations in the final receiver at the end of the transmitting chain. Moreover, the amount of apparatus required when using piezoelectric oscillators, especially in the case where a large number of repeater stations have to be provided such as in mountainous terrain, may become excessive and prohibitive from both a practical and economic point of view.

Accordingly, it is an object of the present invention to provide a novel arrangement and method by which the above disadvantages are substantially overcome and the use of piezoelectric or other stabilized oscillators is avoided.

With this basic object in view, the invention involves generally the provision of an arrangement for carrying out at least one frequency conversion of an electric oscillation within a fractional path or portion of its total transmission path by superimposing the oscillation to be converted upon or mixing it with an oscillation generated by an auxiliary oscillator in a secondary path or circuit. There is furthermore provided according to the invention a frequency comparison circuit or discriminator responsive to deviations of the frequency of an oscillation occurring in the secondary circuit from the frequency of an oscillation passing through the main transmission circuit, and adapted to produce a corresponding control voltage proportional to said frequency deviation and utilized for stabilizing the frequency of the auxiliary or beating oscillator.

The invention, both as to its further objects and novel aspects, will become more apparent from the following detailed description of a few practical embodiments thereof, taken in reference to the accompanying drawings forming part of this specification and wherein:

Figure 6 is a fractional circuit diagram illustrating a harmonic generator suitable for use in connection with the invention.

Like reference characters identify like parts and magnitudes throughout the different views of the drawings.

Figure 1:
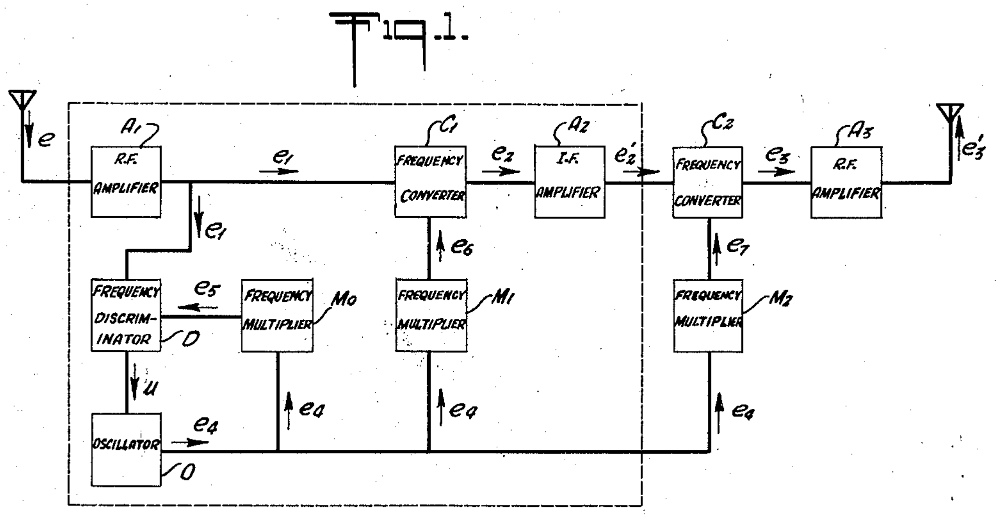
Figures 1 to 4 illustrate in block diagrammatic form various modifications of the invention as embodied in a repeater station for high frequency relay systems.

Referring more particularly to Figure 1, there is shown in block diagram form a repeater system embodying the principles of the invention and suitable for use in connection with a radio relay chain employing ultra-high frequency or microwave electromagnetic oscillations. The main transmission path of the system shown comprises a pre-amplifier $A_1$ for amplifying an incoming high frequency signal oscillation $e$, a first mixer or frequency converter $C_1$ for combining the amplified signal oscillation $e_1$ with an auxiliary oscillation and to convert the same to a first intermediate frequency, an intermediate frequency amplifier $A_2$ for amplifying the intermediate frequency oscillation $e_2$, a second converter $C_2$ for additionally changing the frequency of the intermediate frequency oscillation and a final power or transmitting amplifier $A_3$ for amplifying the second intermediate frequency oscillation $e_3$ to produce an output oscillation $e_3'$ of sufficient power necessary for radiation by the transmitting antenna of the repeater station.

More particularly, the pre-amplified signal oscillation $e_1$ having a frequency $f_1$ is superimposed upon or mixed in the converter stage $C_1$ with an auxiliary oscillation $e_6$ having a frequency $f_6$, whereby to result in an intermediate frequency oscillation $e_2$ derived from the output of the converter and which upon further amplification by the intermediate frequency amplifier $A_2$ is in turn superimposed upon or mixed in the converter $C_2$ with a further auxiliary oscillation $e_7$ having a frequency $f_7$, in such a manner as to result in a final transmitting oscillation $e_3$ having a frequency $f_3$ and impressed upon the transmitting antenna by way of the transmitting amplifier $A_3$.

The auxiliary or beating oscillations $e_6$ and $e_7$ are produced as follows: The frequency $f_4$ of the oscillation $e_4$ generated by an auxiliary oscillator O is multiplied, on the one hand, by a factor $n_1$ in the frequency multiplier $M_1$ and, on the other hand, by a factor $n_2$ in the frequency multiplier $M_2$, in such a manner as to result in the auxiliary or beating oscillations $e_6$ and $e_7$, respectively. Furthermore, the frequency multiplier $M_0$ serves to multiply the frequency $f_4$ of the auxiliary oscillation $e_4$ by a factor $n_0$ chosen in such a manner as to result in an auxiliary oscillation $e_5$ of frequency $f_5$ which latter coincides approximately with the frequency $f_1$ of the received oscillations $e_1$. The frequencies $f_1$ and $f_5$ of the oscillations $e_1$ and $e_5$ are compared by the frequency discriminator D, the latter being designed to produce an output or control voltage $u$ proportional to the relative frequency departure between said oscillations $e_1$ and $e_5$ and serving for influencing or controlling the frequency of the oscillation $e_4$ of the auxiliary oscillator O, i. e. in turn controlling the frequencies of the beating oscillations $e_6$ and $e_7$ derived from the oscillation $e_4$ by the frequency multiplication process.

If the frequencies of the oscillations $e_1$, $e_2$, $e_3$, . . . are designated by $f_1$, $f_2$, $f_3$, . . . , respectively, the following mathematical relation is obtained between the input and output frequencies of the repeater:

$$f_5=n_0\cdot f_4;\ f_6=n_1\cdot f_4;\ f_7=n_2\cdot f_4$$

wherefrom $f_3$ is obtained as follows, after equalization of $f_5$ with $f_1$:

$$f_3=f_1\pm f_6\pm f_7=\frac{n_0\pm n_1\pm n_2}{n_0}\cdot f_1$$

From this equation, it is seen that the output transmitting frequency $f_3$ bears a whole number relation to the input or receiving frequency $f_1$, inasmuch as the multiplication factors $n_0$, $n_1$ and $n_2$ also are whole numbers. Accordingly, it is possible to obtain a frequency relation or ratio between the receiving and transmitting frequencies approaching the factor 1 as closely as possible to avoid feed-back or regenerative effects and without having to use inconvenient multiplication factors for the various frequency multipliers. Thus assuming, by way of example, multiplication factors $n_0=4$, $n_1=2$ and $n_2=3$, the output-input frequency ratio $f_3:f_1$ will be equal to 5:4, provided that the component of difference frequency $f_1-f_6$ derived from the converter $M_1$ and that the component of sum frequency $f_2+f_7$ derived from the converter $M_2$ are used. The continuous control of the frequency of the auxiliary oscillator O by means of the discriminator D thus insures a constant maintenance of the output-input frequency ratio $f_3:f_1$.

Figure 2:
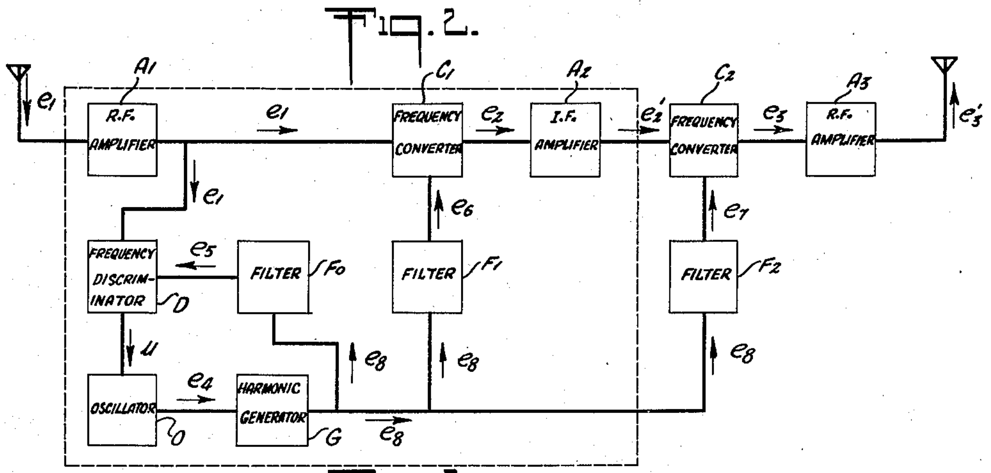

Referring to Figure 2 there is shown a modification of the arrangement according to Figure 1. The section or portion of the main transmission path is again assumed to be in the form of a repeater circuit forming a part of a high frequency relay system. The auxiliary oscillator O produces an auxiliary oscillation $e_4$ which by means of the harmonic generator G is converted into a mixture $e_8$ of harmonics of the oscillation $e_4$. The harmonic generator G may comprise at least one amplifying tube having or being operated upon a portion of its non-linear characteristic in such a manner as to produce a mixture of harmonic components of a substantially sinusoidal input oscillation $e_4$. Suitable harmonics $e_5$, $e_6$ and $e_7$ are segregated from the mixture or distorted voltage wave $e_8$ by means of bandpass filters $F_0$, $F_1$ and $F_2$, respectively. The oscillations $e_6$ and $e_7$ are superimposed upon or mixed with the oscillations $e_1$ and $e_2$ in the converters or mixers $M_1$ and $M_2$, respectively, while the auxiliary oscillation $e_5$ is compared with the receiving oscillation $e_1$ in the comparison circuit or discriminator D, in substantially the same manner as in Figure 1. Accordingly, control or output voltage $u$ of the discriminator varies in proportion to the frequency difference $f_1-f_5$ and is again used for stabilizing the frequency of the auxiliary oscillator O. Thus again, the receiving frequency $f_1$ and the transmitting frequency $f_3$ will be at a whole number relation, since the harmonic oscillations $e_5$, $e_6$ and $e_7$ supplied by the generator G are in whole number relation to the oscillation $e_4$ of the auxiliary oscillator O.

The oscillation $e_1$ applied from the pre-amplifier $A_1$ to the discriminator D in both Figures 1 and 2 has a relatively small amplitude compared with the amplitude of the auxiliary oscillations, since the gain or degree of amplification of the pre-amplifier is rather limited. According to an improved feature of the invention, it is possible, in place of the receiving frequency, to utilize either the intermediate frequency oscillation or the transmitting frequency oscillation for the comparison with the frequency of the auxiliary oscillator, as shown more clearly by the embodiments of the invention according to Figures 3 and 4.

Figure 3 again shows a repeater station similar to Figures 1 and 2, comprising a discriminator D to which is applied in addition to the auxiliary oscillation $e_5$, an oscillation $e_9$ derived from the amplified intermediate frequency oscillation $e_2'$ by means of the frequency multiplier $M_3$, oscillation $e_9$ taking the place of the oscillation $e_1$ in the arrangements of Figures 1 and 2. There is thus produced a control voltage $u$ varying in proportion to the difference between the frequency $f_9$ and $f_5$ and serving for stabilizing the auxiliary oscillator O. If $f_1$, $f_2$, $f_3$, . . . again represent the frequencies of the oscillations $e_1$, $e_2$, $e_3$, . . ., respectively, it will be seen that in this case too, the receiving frequency $f_1$ forms a whole number relation with the transmitting frequency $f_3$ on account of the fact that $f_5$, $f_6$, and $f_7$, are whole multiples of frequency $f_4$ and $f_9$ is a whole multiple of frequency $f_2$.

Since $f_9=n_3f_2$ and $f_5$ is equalized with $f_9$ by the automatic frequency control, and since furthermore the same equations apply to $f_5$, $f_6$, and $f_7$ as in the previous example, the final or transmitting frequency $f_3$ is obtained as follows:

$$f_3=f_1\pm f_6\pm f_7=\frac{n_0\pm n_2n_3}{n_0\pm n_1n_3}f_1$$

Thus, assuming the multiplying factors to be $n_0=4$, $n_1=2$, $n_2=3$ and $n_3=2$, it follows that $f_3:f_1=4:5$, provided that again the difference frequency $f_1-f_6$ derived from the converter $M_1$ and the sum frequency $f_2+f_7$ derived from the converter $M_2$ are utilized.

According to a simplified procedure, it is possible to utilize at least one amplification factor equal to 1 in which case the corresponding frequency multiplier may be omitted. An especially simple arrangement is obtained if $n_0=n_3=1$, i. e. with the multipliers $M_3$ and $M_0$ being omitted. In the latter case, the auxiliary frequency $f_4$ is directly compared with the intermediate frequency $f_2$.

Figure 4:
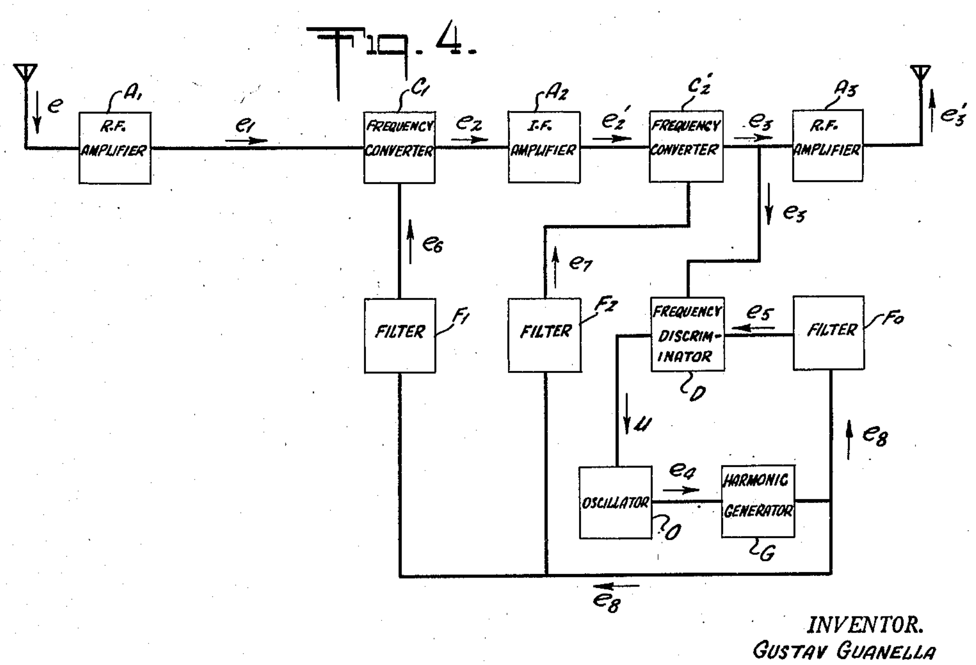

Figure 4 shows a further embodiment of the invention, wherein in a manner analogous to Figure 2 a harmonic generator G is provided to produce a mixture $e_8$ of harmonic components of the auxiliary frequency $e_4$, from which mixture the desired beating frequencies are segregated by means of tuned or bandpass filters $F_0$, $F_1$ and $F_2$, respectively. In the example shown, the discriminator circuit D is excited by transmitting oscillations having a frequency $f_3$ and the auxiliary oscillation having a frequency $f_5$, resulting in a control voltage $u$ proportional to the difference $f_3-f_5$ for stabilizing the auxiliary oscillator O. Again, the transmitting frequency $f_3$ bears a whole number relation to the receiving frequency $f_1$, as is understood.

From the foregoing it will be obvious that numerous variations and modifications may be made in the arrangements shown and described in accordance with the broader scope and principles of the invention, for both a single or an increased number of frequency conversion stages, whereby in each case, the auxiliary or beating oscillations are derived from a single auxiliary oscillator stabilized by means of a control voltage obtained from a frequency comparison circuit or discriminator and being proportional to the relative departure between the frequency of an oscillation derived from the main transmission path, on the one hand, and the frequency of an auxiliary oscillation derived from the secondary or auxiliary oscillator circuit, on the other hand.

While the invention has been illustrated with reference to a repeater station for use in connection with radio relay links, the stabilized frequency conversion may also be used in a standard superheterodyne receiver or any other circuit involving the conversion of a signal oscillation of given frequency into an oscillation of different frequency bearing a predetermined relation to the frequency of the signal oscillation.

In the case of a superheterodyne receiver, only those parts will be required which are enclosed by the dashed rectangle in Figures 1 and 2. The portion of the transmission path utilized for the frequency conversion is then comprised by the pre-amplifier $A_1$, the converter $C_1$ and the intermediate frequency amplifier $A_2$ of a standard superheterodyne receiving circuit. The auxiliary circuit may include the auxiliary oscillator O, the frequency multipliers $M_0$ and $M_1$ and the discriminator D as shown in Figure 1 or alternatively, the auxiliary oscillator O, harmonic generator G, band-pass filters $F_0$ and $F_1$ and the discriminator D in the case of Figure 2. The intermediate frequency oscillation may be applied directly to a de-modulator and associated output circuits in the manner of known superheterodyne amplifiers.

The invention is equally suitable for use in connection with amplitude modulated as well as frequency modulated oscillations. If the incoming signal oscillation $e$ is frequency modulated, the above frequencies $f_1$, $f_2$, $f_3$, . . . represent the center or mean carrier frequencies of the respective signals. The instantaneous frequency variations or deviations from the center frequency in accordance with the variations of a modulating or signal voltage, result in an additional alternating component superimposed upon the control voltage $u$ supplied by the discriminator D. In this case, it is possible in a known manner to remove the low frequency or signal component from the control voltage by means of a low pass filter, to eliminate any effect of the modulating signal variations upon the frequency stabilizing action of the auxiliary oscillator O, in a manner well known in connection with automatic frequency control or stabilized center frequency modulated oscillators. Under these conditions, both the frequency $f_4$ of the auxiliary oscillator as well as the frequencies $f_6$ and $f_7$ used for mixing or beating with the signal oscillations are maintained at constant values, whereby the frequency modulation or deviation of the receiving oscillation also remains constant and is conveyed upon the transmitting oscillation without change or variations. This constitutes a further advantage of the invention compared with known frequency converter systems used in relay repeater stations and involving a frequency multiplication or division by either doubling the incoming frequency or by dividing it by one-half.

Figure 3:
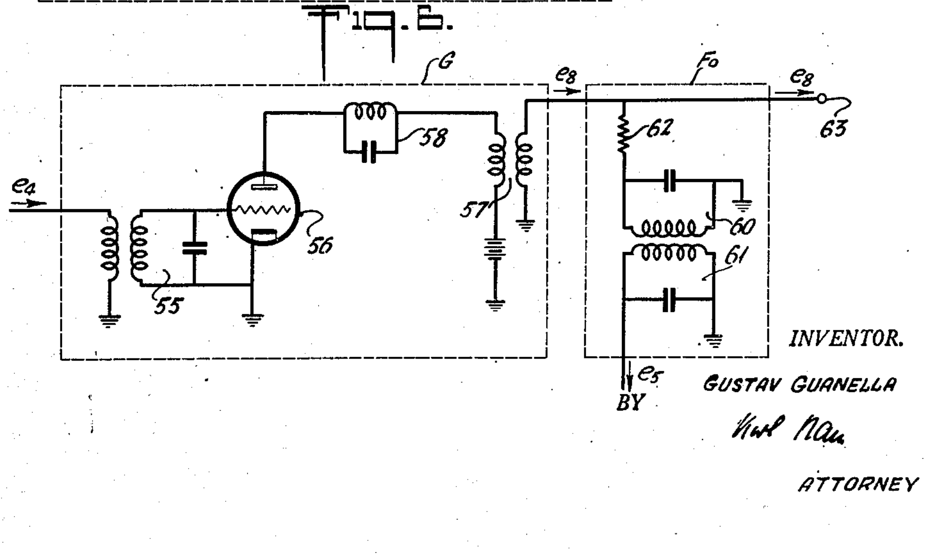
Figure 3:
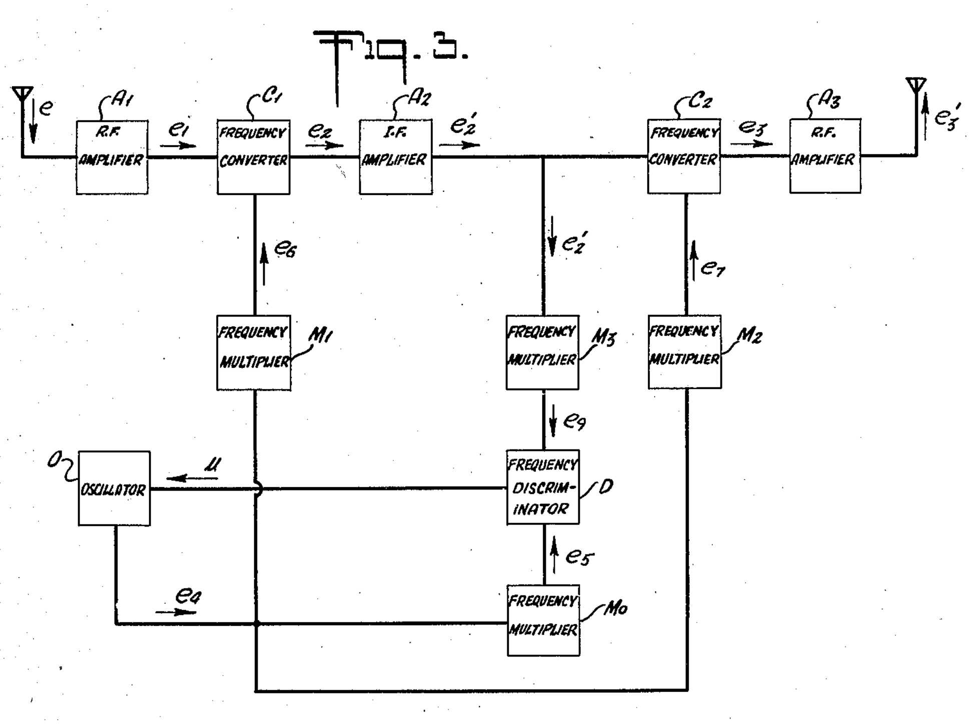
Figure 5:
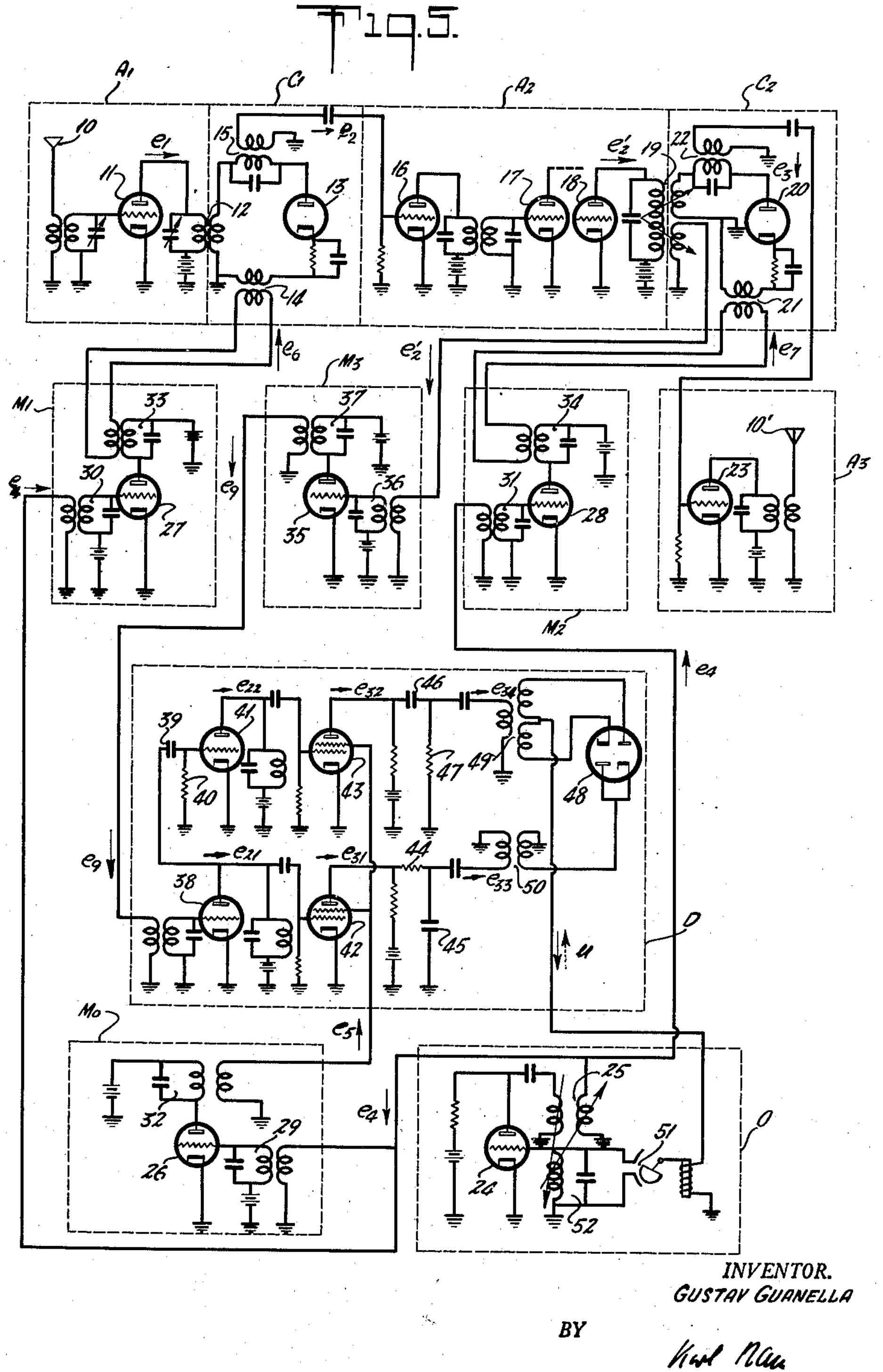
Figure 5 is a detailed circuit diagram of a radio repeater station of the type according to Figure 3.

Referring to Figure 5, there is shown a detailed circuit diagram of a relay repeater system of the type according to Figure 3.

The oscillation $e_1$ intercepted by the receiving antenna 10 is amplified by means of an amplifier tube 11 forming part of the pre-amplifier $A_1$ and the amplified output voltage $e_1$ is applied by way of a coupling transformer 12 to the first converter stage $C_1$ containing a diode rectifier 13 in the example illustrated. At the same time, the heterodyning or beating oscillation $e_6$ is applied to the diode circuit by way of a further coupling transformer 14, whereby to result in an intermediate frequency oscillation or voltage $e_2$ applied from the converter $C_1$ to the intermediate frequency amplifier $A_2$ in the manner described hereinabove.

The intermediate frequency amplifier $A_2$ is shown to comprise three amplifying stages or tubes 16, 17 and 18, although any degree of amplification may be provided by using a corresponding number of amplifying stages connected in cascade in a manner well known. The amplified intermediate frequency voltage $e_2'$ is in turn applied by way of an inductive coupling 19 to the second converter stage $C_2$ comprising a diode 20 as a mixing or converting element. The beating or heterodyning voltage $e_7$ is applied to the diode circuit by way of the inductive coupling 21, whereby to result in a final transmitting oscillation $e_3$ derived by means of a further coupling 22 and being impressed upon the transmitting antenna 10' by way of the power or transmitting amplifier $A_3$ comprising an amplifier tube 23, as shown in the example illustrated.

The auxiliary oscillator O is comprised of a regeneratively coupled amplifying tube 24 and supplies the auxiliary oscillation $e_4$, components of which are applied to the frequency multipliers $M_0$, $M_1$ and $M_2$ by way of coil 25 inductively coupled with the oscillator circuit. Each of the three multipliers $M_0$, $M_1$ and $M_2$ comprises a tube 26, 27 and 28 having grid circuits 29, 30 and 31, respectively, which are tuned to the frequency of the auxiliary oscillation $e_4$. Due to the different tuning adjustment of the anode circuits 32, 33 and 34 of the tubes 26, 27 and 28, respectively, the various auxiliary oscillations $e_5$, $e_6$ and $e_7$ are derived from the output of the multipliers, their frequencies being a multiple of the frequency of the oscillation $e_4$, in the manner described hereinabove. The voltages $e_6$ and $e_7$ are applied to the converters $C_1$ and $C_2$ in the manner described above. The voltage $e_5$ is applied to the input of the discriminator D as will be described in greater detail hereafter.

There is furthermore derived from the converter $C_2$ by way of the inductive coupling 19 a component of the intermediate frequency voltage $e_2'$, said component being applied to the grid circuit 36 of the frequency multiplier $M_3$ which includes a multiplying tube 35. Depending upon the tuning of the anode oscillatory circuit 37 of tube 35 a voltage $e_9$ having a frequency which is a multiple of the frequency of the oscillation $e_2'$ is applied to the frequency discriminator D for comparison with the frequency of the oscillation $e_5$.

In the frequency discriminator D, the voltage $e_9$ upon amplification by the tube 38 serves to produce a further voltage $e_{21}$ from which in turn a voltage $e_{22}$ is produced upon phase rotation by 90° by means of the capacitor 39 and resistor 40 and subsequent amplification by the tube 41. Accordingly, the voltages $e_{21}$ and $e_{22}$ represent the components of a rotary field being relatively displaced in phase by 90°. By means of the multigrid tubes 42 and 43 both these components are intermodulated with the voltage $e_5$, to result in two further voltages $e_{31}$ and $e_{32}$ whose frequency coincides with the difference frequency between the input voltages $e_5$ and $e_9$. The voltages $e_{31}$ and $e_{32}$ again represent the components of a rotary field rotating in a left hand or right hand direction depending upon whether the frequency of $e_5$ is less or higher than the frequency of $e_9$.

The voltages $e_{31}$ and $e_{32}$ are again mutually phase-shifted by means of the phase shifting circuits comprising the resistor 44 and capacity 45, on the one hand, and the capacity 46 and the resistor 47, on the other hand, whereby to result in further voltages $e_{33}$ and $e_{34}$ which are of like or opposite phase, depending upon whether the frequency of the voltage $e_5$ is higher or less than the frequency of the voltage $e_9$, respectively.

Voltages $e_{33}$ and $e_{34}$ are applied to a double diode 48 for rectification and combination in opposition, in such a manner as to result in a direct current control voltage $u$ of varying direction depending upon whether the voltages $e_{33}$ and $e_{34}$ applied through transformers 50 and 49 are of like or opposite phase, as will be understood from the foregoing. Control voltage $u$ may be utilized to vary the frequency of the local oscillator O in such a manner as to counteract or compensate variations from its normal frequency, such as by means of a magnetic control device directly mechanically operating an adjustable condenser 51 associated with the resonant or tank circuit 52 of the oscillator. As a result, any relative deviation from the fixed ratio between the transmitting and receiving frequencies will be substantially instantly compensated by the automatic frequency control or stabilizing action of the system, in the manner described and understood from the foregoing.

As is understood, any other known type of control device for varying the oscillator frequency by the control current $u$ such as an electronic reactance tube may be used for the purpose of the invention. Furthermore, in place of electromagnetic operation of the condenser 51, the voltages $e_{31}$ and $e_{32}$ may be used to excite the rotary field of a two-phase motor which in turn controls the condenser 51. As is well known, the sense of rotation of such a motor depends upon which of the frequencies $f_5$ and $f_9$ is relatively higher than the other frequency, so that again an automatic frequency control and stabilization of the auxiliary oscillator frequency $f_4$ may be maintained, in the manner understood from the above.

Referring to Figure 6 there is shown a more detailed circuit diagram of the harmonic generator G and associated bandpass filter according to Figures 2 and 4.

The voltage $e_4$ generated by the auxiliary oscillator is applied to the grid of the harmonic generator tube 56 by way of the oscillatory circuit 55 tuned to the frequency of said oscillation, the operating point of this tube being so adjusted as to be located upon the non-linear portion of the tube characteristic, in which case a number of harmonic components will be generated in the anode circuit in addition to the fundamental oscillation $e_4$. This frequency mixture is then applied by way of an inductive coupling to the bandpass filters $F_0$, $F_1$, . . . The fundamental oscillation $e_4$ may be suppressed in the generator G by suitably tuning the circuit 58. Only a single output filter $F_0$ has been shown, but it is understood that any desired number of filters may be provided for deriving corresponding harmonics for use in connection with the frequency conversion system of the invention. In the example shown, the oscillatory circuits 60 and 61 are tuned to the frequency of the oscillation $e_5$ to be segregated and the coupling of the circuit is so chosen as to provide a desired bandwidth depending upon the type of signal being transmitted. The resistance 62 serves to prevent mutual interference between the bandpass filter $F_0$ and the line 63 to which additional filters $F_1$, $F_2$, . . . may be connected in a similar manner as shown by the example according to Figures 2 and 4.

While there have been disclosed and described a few desirable embodiments of the invention, it is understood that various changes and modifications in the parts and circuits as well as the substitution of equivalent parts and circuit elements for those shown herein for illustration, may be made without departing from the scope and spirit of the invention. The specification and drawings are accordingly to be regarded in an illustrative rather than in a restrictive sense.

I claim:

1. In a frequency conversion system, an input circuit, an output circuit, means for changing the output frequency of said system to bear a predetermined constant relation to the input frequency, said means comprising a local oscillator, converting means for beating the input signal oscillations with an oscillation derived from and bearing a whole number including unity frequency ratio with said local oscillator for producing combination frequency output oscillations, frequency comparison means including means for exciting the same by auxiliary energies derived from and bearing whole number including unity frequency ratios with, respectively, said local oscillator and a circuit intermediate said input and said output circuit for producing control energy varying in sense and magnitude in proportion to the relative frequency departure between said auxiliary energies, and means for controlling the frequency of said oscillator by said control energy to maintain a substantially zero frequency difference between said auxiliary energies.

2. In a frequency conversion system, an input circuit, an output circuit, means for changing the output frequency of said system to bear a predetermined constant relation to the input frequency, said means comprising a self-excited local oscillator, converter means for beating the input oscillations with oscillations derived from and bearing a whole number including unity frequency ratio with said local oscillator for producing combination frequency output oscillations, frequency comparison means including means for exciting the same by auxiliary energies derived from and bearing whole number including unity frequency ratios with, respectively, said oscillator and a circuit intermediate said input and said output circuits for producing a direct control current varying in magnitude and direction in proportion to the relative frequency departure between said auxiliary energies, and means for controlling the frequency of said oscillator by said control current to maintain a substantially zero frequency difference between said auxiliary energies.

3. In a frequency conversion system, an input circuit, an output circuit, means for changing the output frequency of said system to bear a predetermined constant relation to the input frequency, said means comprising a local oscillator, converter means for beating the input oscillations with an oscillation derived from and bearing a whole number including unity frequency ratio with said local oscillator for producing combination frequency output oscillations, frequency multiplying means connected to said oscillator for producing an auxiliary oscillation having a frequency being a whole number multiple of the oscillator frequency, frequency comparison means including means for exciting the same by components of the input frequency and said auxiliary oscillation for producing control energy varying in sense and magnitude in proportion to the relative frequency departure between said input and auxiliary oscillations, and means for controlling the frequency of said oscillator to maintain a substantially zero frequency difference between said auxiliary and input oscillations.

4. In a frequency conversion system, an input circuit, an output circuit, means for changing the output frequency of said system to bear a predetermined constant relation to the input frequency, said means comprising a self-excited local oscillator, frequency converting means for beating the input oscillations with an oscillation derived from and bearing a whole number including unity frequency ratio with said local oscillator for producing combination frequency output oscillations, frequency multiplying means connected to said oscillator for producing an auxiliary oscillation having a frequency being a whole number multiple of the oscillator frequency, frequency comparison means with means for exciting the same by components of the input frequency and said auxiliary oscillation for producing a direct control current varying in sense and magnitude in proportion to the relative frequency departure between said input and auxiliary oscillations, and means for controlling the frequency of said oscillator by said control current to maintain a substantially zero frequency difference between said auxiliary and said input oscillations.

5. In a frequency conversion system, an input circuit, an output circuit, means for changing the output frequency of said system to bear a predetermined constant relation to the input frequency, said means comprising a local oscillator, frequency converting means for beating the input oscillations with an oscillation derived from and bearing a whole number including unity frequency ratio with said local oscillator for producing combination frequency output oscillations, frequency multiplying means comprising a harmonic generator and filter means and connected to said oscillator for producing an auxiliary oscillation having a frequency being a multiple of the oscillator frequency, frequency comparison means including means for exciting the same by components of the input frequency and said auxiliary oscillation for producing a direct control current varying in sense and magnitude in proportion to the relative frequency departure between said input and auxiliary oscillations, and means for controlling the frequency of said oscillator by said control current to maintain a substantially zero frequency difference between said auxiliary and input oscillations.

6. In a frequency conversion system, an input circuit, an output circuit, means for changing the output frequency of said system to bear a predetermined constant relation to the input frequency, said means comprising a local oscillator, frequency converting means for beating the input oscillations with an oscillation derived from and bearing a whole number including a unity frequency ratio with said local oscillator for producing combination frequency output oscillations, frequency comparison means including means for exciting the same by components of said output frequency and an auxiliary oscillation bearing a whole number including unity frequency ratio with said local oscillator for producing control energy varying in sense and magnitude in proportion to the relative frequency departure between said output frequency and the frequency of said auxiliary oscillation, and means for controlling the frequency of said oscillator to maintain a substantially zero frequency difference between said output frequency and the frequency of said auxiliary oscillations.

7. In a frequency conversion system, an input circuit, an output circuit, means for changing the output frequency of said system to bear a predetermined constant relation to the input frequency, said means comprising a local oscillator, frequency converting means for beating the input signal oscillations with an oscillation derived from and bearing a whole number including unity frequency ratio with said local oscillator for producing combination frequency output oscillations, frequency multiplying means connected to said oscillator for producing an auxiliary oscillation bearing a whole number frequency ratio with said local oscillator, frequency comparison means including means for exciting the same by components of said output frequency and said auxiliary oscillation for producing control energy varying in sense and magnitude in proportion to the relative frequency departure between said output frequency and the frequency of said auxiliary oscillation, and means for controlling the frequency of said local oscillator by said control energy to maintain a substantially zero frequency difference between said output energy and said auxiliary oscillation.

8. In a frequency conversion system, an input circuit, an output circuit, means for changing the output frequency of said system to bear a predetermined constant relation to the input frequency, said means comprising a self-excited local oscillator, frequency converting means for beating the input oscillations with an oscillation derived from and bearing a whole number including unity frequency ratio with said local oscillator for producing combination frequency output oscillations, frequency multiplying means comprising a harmonic generator and filter means and connected to said oscillator for producing an auxiliary oscillation, frequency comparison means including means for exciting the same by components of said output frequency and said auxiliary oscillation for producing a direct control current varying in sense and magnitude in proportion to the relative frequency departure between said output frequency and the frequency of said auxiliary oscillation, and means for controlling the frequency of said local oscillator by said control current to maintain a substantially zero frequency difference between said output frequency and the frequency of said auxiliary oscillation.

9. In a frequency conversion system, an input circuit, an output circuit, means for changing the output frequency of said system to bear a predetermined constant relation to the input frequency, said means comprising a single local oscillator, a plurality of frequency converters in cascade connected between said input and said output circuit for successively changing the input oscillation frequency by beating with oscillations derived from and bearing predetermined including unity frequency ratios with said local oscillator for producing output oscillations of desired frequency, frequency comparison means including means for exciting the same by auxiliary oscillations derived from and bearing predetermined whole number including unity frequency ratios with, respectively, said local oscillator and an intermediate circuit between said input and said output circuits for producing control energy varying in sense and magnitude in proportion to the relative frequency departure between said auxiliary oscillations, and means for controlling the frequency of said oscillator by said control energy to maintain a substantially zero frequency difference between said auxiliary oscillations.

10. In a frequency conversion system, an input circuit, an output circuit, means for changing the output frequency of said system to bear a predetermined constant relation to the input frequency, said means comprising a single self-excited local oscillator, a plurality of frequency converters in cascade connected between said input and said output circuits for successively changing the input oscillation frequency by beating with oscillation components derived from and bearing predetermined including unity frequency ratios with said local oscillator for producing final output oscillations of desired frequency, means including frequency multiplying means for producing a pair of auxiliary oscillations derived from and bearing whole number frequency ratios with, respectively, said oscillator and a circuit intermediate said input and said output circuits, frequency comparison means including means for exciting the same by said auxiliary oscillations for producing a direct control current varying in sense and magnitude in proportion to the relative frequency departure between said auxiliary oscillations, and means for controlling the frequency of said local oscillator by said control current to maintain a substantially zero frequency difference between said auxiliary oscillations.

GUSTAV GUANELLA.

REFERENCES CITED

The following references are of record in the file of this patent:

UNITED STATES PATENTS

| Number | Name | Date |
|---|---|---|
| 2,094,113 | Affel | Sept. 28, 1937 |
| 2,211,750 | Humby et al. | Aug. 20, 1940 |
| 2,282,834 | Thomas | May 12, 1942 |
| 2,354,510 | Earp | July 25, 1944 |
| 2,369,268 | Trevor | Feb. 13, 1945 |
| 2,405,765 | Smith | Aug. 13, 1946 |
| 2,406,932 | Tunick | Sept. 3, 1946 |
| 2,407,213 | Tunick | Sept. 3, 1946 |